United States Patent Office 2,800,510
Patented July 23, 1957

2,800,510
PREPARATION OF KETOLS

John G. Miller, Drexel Hill, Pa., assignor to Porocel Corporation, Philadelphia, Pa., a corporation of Delaware No Drawing. Application June 13, 1950,
Serial No. 167,919

6 Claims. (Cl. 260—594)

This invention relates to a process for the production of ketols by the aldol condensation of ketones, and more particularly, to the production of ketols from the aldol condensation of low molecular weight ketones in the presence of an activated alumina-containing catalyst.

It is an object of this invention to produce a variety of ketols suitable as solvents or intermediates in the synthesis of other valuable products.

It is a further object of this invention to produce ketols by the aldol condensation of ketones utilizing a catalyst resistant to attrition and capable of simple regeneration.

It has been proposed heretofore to produce ketols by causing ketones to undergo aldol condensation reactions utilizing such catalysts as sodium hydroxide, calcium hydroxide, or barium hydroxide. These catalysts, while giving relatively good yields of ketols, are objectionable because of their loss of activity due to contact with air or with water vapor. They are also difficult to regenerate and may be used only for relatively short periods of time, generally in batchwise operations.

These difficulties are avoided in the present invention by the use of an activated alumina catalyst, preferably thermally activated bauxite. Thermally activated bauxite is stable; it is not easily deactivated by contact with air, and is capable of regeneration to substantially its original activity simply by heating at relatively low temperatures.

The ketones to which the present invention may be applied include acetone, methyl ethyl ketone, methyl propyl ketone, diethyl ketone, and similar low molecular weight ketones, and mixtures thereof containing a hydrogen atom on the carbon atom alpha to the carbonyl group and capable of undergoing the enolization reaction. A relatively large number of ketones, including those containing an aromatic ring joined to the carbonyl group through a methylene group, mixed alkyl aryl ketones, or cycloalkyl ketones, meet the requirements of having an active hydrogen atom on the alpha carbon adjacent the carbonyl group. It should be noted, however, that as the size of the molecule increases, the ease with which the enolization reaction occurs becomes increasingly more difficult so that except in the case of compounds having up to three or four carbon atoms in the alkyl group, the reaction generally is too slow to give appreciable yields under aldol condensation conditions.

The aldol condensation reaction of the present invention may be carried out in the following manner. The ketone is charged to a flask equipped with the conventional Soxhlet extraction system comprising a Soxhlet extractor and a reflux condenser. The thimble in the Soxhlet extractor is filled with bauxite of 20 to 60 mesh which has been activated at a temperature of about 1200° F. for thirty minutes, although other temperatures and times of activation may be used as described hereinafter. The ketone is brought to refluxing conditions and maintained under such conditions by the use of a suitable heat source such as a steam or oil bath until a major portion of the ketone is reacted, generally requiring from 20 to 200 hours. The material in the flask then is removed and distilled under reduced pressure to obtain the pure ketol.

The catalysts which may be employed in the present invention may be either synthetic or naturally occurring aluminous materials. Synthetic materials include those catalytic materials comprising various forms of alumina known generically as activated alumina. The naturally occurring materials include those in which alumina is the principal constituent such, for example, as bauxite, and in which only minor amounts of impurities are present. Naturally occurring materials such as fuller's earth, which contains only minor amounts of alumina with major amounts of other oxides such as silica, have been found to be unsuitable as catalysts for this reaction. Bauxite is preferred over the synthetic alumina catalysts because of its availability and ease of activation.

When bauxite is used as the catalyst, it is first thermally activated by heating to temperatures ranging between 600° F. and 1600° F. to volatile matter contents ranging preferably between 10% and 2%. This material is screened to separate particles ranging in size between 20 and 60 mesh, although smaller or larger size particles may be used. For ease of operation, however, the 20 to 60 mesh size is preferred. The following examples are given to further illustrate the invention, but these examples should not be construed as limiting the invention thereto.

EXAMPLE I

A 1000 cc. flask was equipped with a Soxhlet extractor and a reflux condenser and placed on a steam bath. 500 cc. of anhydrous acetone was added to the flask and 50 cc. of bauxite, 20 to 60 mesh, activated at 1200° F. for 30 minutes, was placed in the Soxhlet thimble. The contents of the flask were brought to refluxing conditions and the refluxing continued for 179.1 hours. The contents of the flask were then removed and distilled under vacuum. The fraction boiling between 69° C. and 76° C. at 23 mm. of mercury was considered as the yield of diacetone alcohol which in this case amounted to 43%.

EXAMPLE II

In equipment identical with that of Example I and with 500 cc. of anhydrous acetone in the flask, refluxing was carried on for 179.1 hours. However, in this case, the Soxhlet thimble contained 50 cc. of fuller's earth, 30 to 60 mesh, activated at 900° F. for 30 minutes. In this case, no diacetone alcohol was formed.

EXAMPLE III

In equipment identical with Examples I and II and with 500 cc. of anhydrous acetone in the flask, refluxing was carried out for 179.1 hours with 50 cc. of $Ba(OH)_2.8H_2O$ in the Soxhlet thimble. This product was removed and distilled under 23 mm. of mercury to obtain a fraction boiling between 69° C. and 76° C. This fraction amounted to a yield of 41.3% diacetone alcohol.

In comparing Examples I and III, it is seen that bauxite gives a better yield than any heretofore accepted catalyst, e. g., barium hydroxide, and has the further advantage of being more resistant to attrition, more stable, and capable of being regenerated. In Example II, in which fuller's earth was employed, it is seen that naturally occurring materials containing only small amounts of alumina are not suitable as catalysts for this reaction.

In Table I, a number of runs are shown utilizing anhydrous methyl ethyl ketone and bauxite of 10 to 30 mesh activated at 1100° F. for 30 minutes. The apparatus employed was similar to that used in each of the above examples. In run #6, included for comparison purposes, barium hydroxide was the catalyst. The product, which consisted of a mixture of ketols boiled between 79° C. and 92° C. under pressures ranging between 8 and 20 mm. of mercury.

Table

| Run No. | Weight of Methyl Ethyl Ketone, grams | Weight of Bauxite, grams | Hours of Refluxing | Weight of Product | Percent Yield of Product |
|---|---|---|---|---|---|
| 1 | 379 | 100 | 33 | 29.5 | 7.8 |
| 2 | 216 | 100 | 109 | 31 | 14.3 |
| 3 | 483 | 100 | 53 | 45 | 9.3 |
| 4 | 483 | 100 | 31 | 36.5 | 7.6 |
| 5 | 483 | 100 | 24.5 | 30.6 | 6.3 |
| 6 | 379 | Ba(OH)$_2$.8H$_2$O 219 | 39 | 20.5 | 5.4 |

From this series of experiments, it is seen that bauxite is superior to barium hydroxide.

Catalysts which promote the formation of ketols by the aldol condensation of ketones, likewise will catalyze the reverse reaction, i. e., the decomposition of ketol into the ketone. This is true with respect to barium hydroxide and it is true also with respect to bauxite. In other words, an equilibrium is established which limits the amount of ketol which may be formed. However, as is well-known to the chemical art, if the product is removed from contact with the catalyst, the equilibrium is disturbed and more product can be formed until equilibrium is restored.

The apparatus used in each of the foregoing examples was typical laboratory equipment and in this instance was designed to effect prompt removal of the reaction products from contact with the catalyst upon reaching equilibrium. In commercial operations, this same effect may be obtained by proper adjustment of the depth of the catalyst bed and the rate of charge of the ketone to the bed. In addition, it will be seen that such a process may be made continuous by simple fractionation of the reaction mixture followed by vacuum distillation of the ketol-rich side stream, the unreacted ketones being recirculated to the charge.

The catalyst gradually will become contaminated and will lose its activity. When using bauxite as the catalyst, however, this does not present any serious problem since as is well known in this art, such a catalyst may be repeatedy regenerated simply by heating at relatively low temperatures.

I claim:

1. A process for the aldol condensation of ketones to produce ketols which comprises heating a low molecular weight ketone under refluxing conditions in the presence of a thermally activated bauxite catalyst.

2. A process for the aldol condensation of ketones to produce ketols which comprises heating a low molecular weight ketone under refluxing conditions in the presence of bauxite which has been activated at temperatures between 600° F. and 1600° F.

3. A process for the aldol condensation of ketones to produce ketols which comprises heating a low molecular weight ketone under refluxing conditions in the presence of bauxite which has been thermally activated at temperatures between 600° F. and 1600° F. to a combined water content ranging between about 2% to about 10%.

4. A process for the aldol condensation of ketones to produce ketols which comprises heating a low molecular weight ketone under refluxing conditions in the presence of bauxite which has been thermally activated at temperatures between 600° F. and 1600° F. to a combined water content ranging between about 2% to about 10%, and removing the ketol from the catalyst following its formation.

5. A process for the aldol condensation of acetone to produce diacetone alcohol which comprises heating the acetone under refluxing conditions in the presence of thermally activated bauxite.

6. A process for the aldol condensation of methyl ethyl ketone to produce a ketol which comprises heating the methyl ethyl ketone under refluxing conditions in the presence of thermally activated bauxite.

References Cited in the file of this patent

UNITED STATES PATENTS

| | | |
|---|---|---|
| 1,778,517 | Benner et al. | Oct. 14, 1930 |
| 1,977,178 | Dohse | Oct. 16, 1934 |
| 2,130,592 | McAllister et al. | Sept. 20, 1938 |
| 2,369,197 | Winkler et al. | Feb. 13, 1945 |
| 2,406,081 | La Lande | Aug. 20, 1946 |

FOREIGN PATENTS

| | | |
|---|---|---|
| 349,915 | Germany | Mar. 10, 1922 |
| 592,116 | Great Britain | Sept. 8, 1947 |

OTHER REFERENCES

Senderens: Bull. Soc. Chim., vol. 3, pp. 823–824 (1908).

Mailhe et al.: Bull. Soc. Chim., vol. 21, pp. 61–64 (1917).

Adkins et al.: J. Am. Chem. Soc., vol. 44, pp. 385–392 (1922).

Ipatieff et al.: Berichte, vol. 60, pp. 753–755 (1927).

Komarewsky et al.: J. Am. Chem. Soc., vol. 65, pp. 547–548 (1943).